US012427962B2

(12) United States Patent
Yhr et al.

(10) Patent No.: US 12,427,962 B2
(45) Date of Patent: Sep. 30, 2025

(54) WHEEL BRAKE ARRANGEMENT FOR A VEHICLE

(71) Applicant: Volvo Truck Corporation, Gothenburg (SE)

(72) Inventors: Hamid Yhr, Gråbo (SE); Ulf Stenbratt, Vallda (SE); Leo Laine, Härryda (SE)

(73) Assignee: Volvo Truck Corporation, Gothenburg (SE)

( * ) Notice: Subject to any disclaimer, the term of this patent is extended or adjusted under 35 U.S.C. 154(b) by 421 days.

(21) Appl. No.: 18/100,656

(22) Filed: Jan. 24, 2023

(65) Prior Publication Data
US 2023/0249556 A1   Aug. 10, 2023

(30) Foreign Application Priority Data

Feb. 4, 2022   (EP) ..................................... 22155105

(51) Int. Cl.
*B60T 13/58* (2006.01)
*B60T 1/06* (2006.01)
*F16D 63/00* (2006.01)

(52) U.S. Cl.
CPC ............ *B60T 13/586* (2013.01); *B60T 1/062* (2013.01); *F16D 63/002* (2013.01)

(58) Field of Classification Search
CPC ............ F16H 3/00–78; F16H 9/00–26; B60T 13/586; B60T 1/062; F16D 63/002; B60L 7/28
See application file for complete search history.

(56) References Cited

U.S. PATENT DOCUMENTS

| 10,688,877 | B2 * | 6/2020 | Glück | ..................... B60L 50/10 |
| 2004/0026191 | A1 * | 2/2004 | Kloft | ..................... B60T 13/586 |
| | | | | 188/161 |
| 2019/0186628 | A1 * | 6/2019 | Kim | ..................... F16H 61/0213 |

(Continued)

FOREIGN PATENT DOCUMENTS

| CN | 102022487 A | * | 4/2011 |
| CN | 107968547 A | | 4/2018 |

(Continued)

OTHER PUBLICATIONS

Extended European Search Report for European Patent Application No. 22155105.4, mailed Jul. 4, 2022, 7 pages.

(Continued)

*Primary Examiner* — David R Morris
(74) *Attorney, Agent, or Firm* — Withrow & Terranova, PLLC

(57) ABSTRACT

A wheel brake arrangement for a vehicle, the wheel brake arrangement comprising an eddy current wheel brake configured to receive electric power from a source of electric power of the vehicle during braking, and a transmission arrangement comprising a first shaft connected to the eddy current wheel brake and a second shaft connectable to a wheel of the vehicle, wherein the transmission arrangement comprises a ratio varying arrangement, the ratio varying arrangement being configured to, for any rotational speed below a predetermined threshold speed of the second shaft during braking, control a rotational speed of the first shaft to be maintained within a predetermined rotational speed range.

13 Claims, 5 Drawing Sheets

(56) References Cited

U.S. PATENT DOCUMENTS

2020/0189543 A1    6/2020  Kurosaki
2022/0194232 A1*   6/2022  Lu ........................ B60T 13/586

FOREIGN PATENT DOCUMENTS

EP          1264748  A1    12/2002
GB           839560  A      6/1960
WO       2020227286  A1    11/2020

OTHER PUBLICATIONS

Extended European Search Report for European Patent Application No. 23154687.0, mailed May 31, 2023, 5 pages.
Examination Report for European Patent Application No. 23154687.0, mailed Feb. 19, 2025, 6 pages.

* cited by examiner

WHEEL BRAKE ARRANGEMENT FOR A VEHICLE

RELATED APPLICATIONS

The present application claims priority to European Patent Application No. 22155105.4, filed on Feb. 4, 2022, and entitled "WHEEL BRAKE ARRANGEMENT FOR A VEHICLE," which is incorporated herein by reference in its entirety.

TECHNICAL FIELD

The present invention relates to a wheel brake arrangement for a vehicle. The invention also relates to a method of controlling a wheel brake arrangement. Although the invention will mainly be directed to a vehicle in the form of a truck, the invention may also be applicable for other types of vehicles using one or more electric motors for generating propulsion power, such as e.g., cars, buses, working machines, and other transportation vehicles.

BACKGROUND

A heavy-duty vehicle, such as a truck or semi-trailer vehicle, normally comprises a service brake system based on friction brakes. Friction brakes, such as disc brakes or drum brakes, are highly efficient in generating braking torque. However, if the friction brakes are used too intensively, a phenomenon referred to as brake fading may occur, which is why friction brakes are not suitable for prolonged periods of use that may, e.g., occur when driving downhill for an extended period of time. Brake fading is caused by a build-up of heat in the braking surfaces and leads to significantly reduced braking capability. To avoid brake fading, heavy-duty vehicles often comprise auxiliary brakes capable of endurance braking, such as engine brakes and various retarder systems.

Electric machines can also be used to brake a vehicle. The electric machine may then act as a generator which converts the kinetic energy from the vehicle into electrical energy. This electrical energy can be fed to an energy storage system (ESS) such as a rechargeable battery or the like, resulting in an overall increase in energy efficiency of the vehicle. Surplus energy from regenerative braking can be fed to a brake resistor where it is converted into heat.

Electric machines do not suffer from brake fading, but since the combined energy absorption capability of the ESS and any brake resistors is limited, the electric machine may still not be able to perform endurance braking for prolonged periods of time. Thus, either additional means for braking need to be installed in the vehicle, or the requirements on the electrical energy system of the vehicle must be over-dimensioned to support endurance braking, which is undesired.

SUMMARY

It is thus an object of the present invention to at least partially overcome the above described deficiencies.

According to a first aspect, there is provided a wheel brake arrangement for a vehicle, the wheel brake arrangement comprising an eddy current wheel brake configured to receive electric power from a source of electric power of the vehicle during braking, and a transmission arrangement comprising a first shaft connected to the eddy current wheel brake, and a second shaft connectable to a wheel of the vehicle, wherein the transmission arrangement comprises a ratio varying arrangement, the ratio varying arrangement being configured to, for any rotational speed below a predetermined threshold speed of the second shaft during braking, control a rotational speed of the first shaft to be maintained within a predetermined rotational speed range.

The transmission arrangement should be construed as an arrangement which, by the ratio varying arrangement, is able to keep the rotational speed of the first shaft to rotate with a desired rotational speed. As will be evident from the below description, the ratio varying arrangement may be electrically or mechanically controlled to vary the rotational speed of the first shaft. The ratio varying arrangement does hence variably change the ratio between the first and second shafts and should thus not be construed as e.g. a gearbox having fixed gear ratios between two shafts. According to an example embodiment, the ratio varying arrangement may be a continuously ratio varying arrangement configured to vary a rotational ratio between the rotational speed of the first shaft and the rotational speed of the second shaft.

The predetermined rotational speed range can be different in magnitude based on the application of use. For example, the predetermined rotational speed range may be different for a heavy-duty vehicle compared to an implementation in a passenger car, as well as between different types of vehicle based on e.g. the number of magnetic poles provided on the eddy current wheel brake, etc.

The present invention is based on the insight that an eddy current wheel brake has an optimum braking capability at a certain rotational speed. When the rotational speed reduces, the brake torque also reduces. For low speed, i.e. during crawling or when approaching stand still, the braking capacity of the eddy current wheel brake can be insufficient for controlling the vehicle as desired. According to an example embodiment, the ratio varying arrangement may be configured to increase the rotational speed of the first shaft relative to the second shaft when the rotational speed of the second shaft is lower than a predetermined rotational threshold level. Preferably, and according to an example embodiment, the ratio varying arrangement may be configured to control the rotational speed of the first shaft to be inverse proportional to the rotational speed of the second shaft.

An advantage of the present invention is thus that an optimized braking capability of the eddy current wheel brake is provided since the first shaft will, even for low vehicle speed, rotate at a speed which is suitable for the eddy current wheel brake. Further, the eddy current wheel brake is in itself advantageous since it does not contain any friction elements and is thereby relatively free from continuous maintenance. Furthermore, the present invention also enables for an anti-lock brake. In detail, when the wheel stops rotating, the eddy current wheel brake stops generating a brake torque. The invention also enables for an amplification and superposition of the total torque supplied by the eddy current wheel brake and the electric machine.

According to an example embodiment, the continuously ratio varying arrangement may be configured to seamlessly vary the rotational ratio between the rotational speed of the first shaft and the rotational speed of the second shaft. Hereby, an operator of the vehicle will not notice the actions of the transmission arrangement.

According to an example embodiment, the eddy current wheel brake may comprise a conductive plate operatively connected to the first shaft, and an electromagnet arranged stationary relative to the conductive plate.

According to an example embodiment, the eddy current wheel brake may comprise a plurality of conductive plates.

Using more than one conductive plate can enable for an increased braking capability of the eddy current wheel brake.

According to an example embodiment, the wheel brake arrangement may further comprise a control unit connected to the transmission arrangement, the control unit comprising control circuitry configured to determine a desired rotational speed of the first shaft, control the ratio varying arrangement to obtain a rotational ratio between the first and second shafts to maintain the desired rotational speed of the first shaft within the predetermined range.

As indicated above, the transmission arrangement may hereby be arranged as an electrically controlled transmission arrangement for varying and keeping the rotational speed of the first shaft to be within the predetermined rotational speed range.

According to an example embodiment, the control unit may form part of an upper layer vehicle motion control system, and wherein the transmission arrangement comprises a transmission control unit connected to the upper layer vehicle motion control system.

According to an example embodiment, the control circuitry of the upper layer vehicle motion control system may be configured to control the ratio varying arrangement by transmitting a signal to the transmission control unit, the signal represents instructions which, when executed by the transmission control unit, cause the ratio varying arrangement to vary the rotational ratio between the first and second shafts.

An advantage is that the upper layer vehicle motion control system can coordinate the braking action between the various electric machines and eddy current wheel brakes for obtaining the desired brake during the demanded braking operation.

According to an example embodiment, the eddy current wheel brake may be electrically connectable to an energy storage system of the vehicle. Hereby, the eddy current wheel brake can be fed by electrical power for generating the braking action from the energy storage system.

According to an example embodiment, the eddy current wheel brake may be electrically connectable to an electric wheel motor of the vehicle, the eddy current wheel brake being configured to receive electric power from the electric wheel motor during braking. An advantage is that electric power generated by the electric machine during braking can be fed to the eddy current wheel brake when e.g. the energy storage system is unable to absorb the generated electric power. Hence, an energy efficient power dissipation is provided.

According to a second aspect, there is provided a method of controlling a wheel brake arrangement, the wheel brake arrangement comprising an eddy current wheel brake configured to receive electric power from a source of electric power of the vehicle during braking, and a transmission arrangement comprising a first shaft connected to the eddy current wheel brake, and a second shaft connected to a wheel of the vehicle, wherein the transmission arrangement comprises a ratio varying arrangement, the method comprising determining a desired rotational speed of the first shaft, and controlling the ratio varying arrangement to obtain a rotational ratio between the first and second shafts to maintain the desired rotational speed of the first shaft within a predetermined range for any rotational speed below a predetermined threshold speed of the second shaft during braking.

Effects and features of the second aspect are largely analogous to those described above in relation to the first aspect. Thus, features described in relation to the first aspect are equally applicable to the second aspect.

According to a third aspect, there is provided a vehicle, the vehicle comprising a wheel and a braking arrangement according to any one of the embodiments described above in relation to the first aspect, wherein the second shaft of the transmission arrangement is connected to the wheel. According to an example embodiment, the vehicle is a heavy-duty vehicle.

According to a fourth aspect, there is provided a computer program comprising program code means for performing the steps of the second aspect when the program is run on a computer.

According to a fifth aspect, there is provided a computer readable medium carrying a computer program comprising program means for performing the steps of the second aspect when the program means is run on a computer.

Effects and features of the third, fourth and fifth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
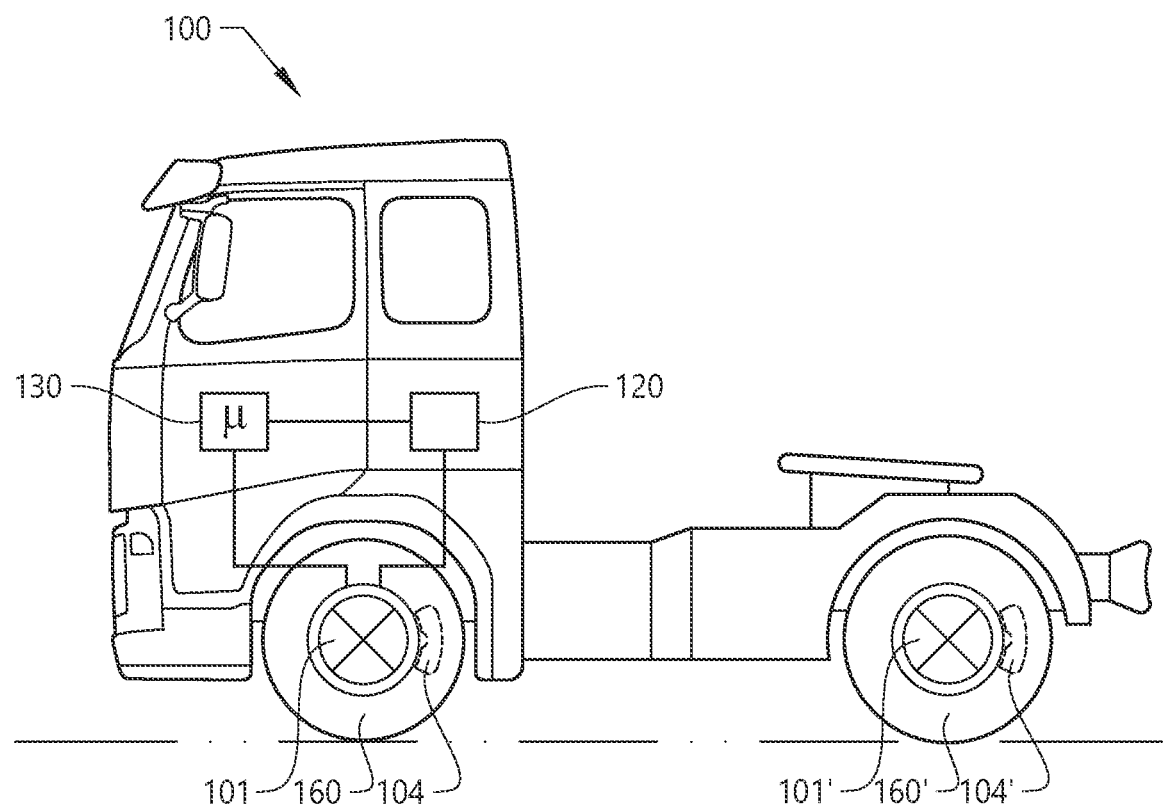
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 1 in the form of a heavy-duty truck for cargo transport. However, a heavy-duty vehicle could also be a vehicle designed for use in construction, mining operations, and the like. It is appreciated that the techniques and devices disclosed herein can be applied together with a wide variety of electrically powered vehicle units, not just that exemplified in FIG. 1. In particular, the techniques disclosed herein are also applicable to, e.g., rigid trucks and multi-trailer electric heavy-duty vehicles comprising one or more dolly vehicle units, etc.

The vehicle 100 is an electrically powered vehicle comprising one or more electric machines 101, 101'. As can be seen in FIG. 1, the exemplified heavy-duty vehicle comprises an electric machine connected to the front steerable wheels 160 and an electric machine connected to the rear wheels 160'. The one or more electric machines are arranged to generate both positive and negative torque, i.e., to provide both propulsion and braking of the vehicle 100. Each of the wheels 160, 160' is also provided with a wheel brake arrangement 200 comprising an eddy current wheel brake 104, 104' which is schematically depicted in FIG. 1, and described in further detail below with reference to FIG. 2.

The vehicle 100 also comprises an energy storage system 120 configured to power the one or more electric machines as well as to feed electric power to the eddy current wheel brakes. The energy storage system 120 may comprise a battery pack and potentially also a fuel cell stack arranged to generate electrical energy from a hydrogen storage tank on the vehicle 100 (not shown in FIG. 1). The energy storage system optionally also comprises a brake resistance arranged to dissipate surplus energy which the electrical energy storage devices on the vehicle cannot accommodate.

A vehicle control unit 130 is arranged to monitor and control various vehicle operations and functions. The vehicle control unit is, e.g., arranged to monitor and control the energy storage system 120 as well as the one or more electric machines 101, 101', and optionally also the operation of the fuel cell stack and the eddy current wheel brakes 104, 104', etc. The vehicle control unit 130 may also comprise, or form part of a higher layer vehicle motion control system comprising control functions such as vehicle route planning and may have access to geographical data comprising height profiles of different planned vehicle routes and the like, as well as positioning data indicating a current location of the vehicle 100.

The vehicle 100 optionally comprises a wireless communications transceiver arranged to establish a radio link to a wireless network comprising a remote server. This way the control unit may access the remote servers for uploading and downloading data. Notably, the vehicle 100 may store measurement data such as amounts of regenerated energy by the one or more electric machines 101, 101', 101" at various geographical locations an along different vehicle routes in local memory or at the remote server. The vehicle control unit 130 may also query the remote server for information about previously experienced amounts of regenerated energy, and/or temperature increases in various vehicle components along a given route.

The vehicle control unit 130 may furthermore be arranged to obtain data indicative of an expected rolling resistance for a given route, either from manual configuration or remotely from the remote server. The rolling resistance of the vehicle 100 will affect the energy consumption of the vehicle as it traverses a route. For instance, a gravel road is likely to require more energy compared to a smoother asphalt freeway. Also, friction and air resistance will reduce the requirements on generating negative torque during downhill driving.

The vehicle control unit 130 may include a microprocessor, microcontroller, programmable digital signal processor or another programmable device. The control unit 130 may also, or instead, include an application specific integrated control circuit, a programmable gate array or programmable array logic, a programmable logic device, or a digital signal processor. Where the control unit 130 includes a programmable device such as the microprocessor, microcontroller or programmable digital signal processor mentioned above, the processor may further include computer executable code that controls operation of the programmable device.

It is required to be able to brake the vehicle 100 as it travels down steep long hills and the like. The electric machines 101, 101' on the vehicle 100 may, as mentioned above, be used to generate braking torque. Electrical energy from the electric machines generated during braking can then be fed to the energy storage system as long as the energy storage system can absorb the power, resulting in recuperated energy and a more energy efficient vehicle operation, which is an advantage. However, when the batteries of the energy storage system are fully charged, no more energy can be absorbed. Furthermore, there may be a limit on maximum current or voltage that can be fed to the batteries of the energy storage system when charging, i.e. the energy storage system may have a maximum electric power absorption capability. If the batteries in the energy storage system cannot accept all of the output energy from the electric machines, surplus energy can be fed to the brake resistor which then dissipates the surplus energy as heat. However, a brake resistor also has a maximum amount of power it can absorb since it will eventually get too hot. Furthermore, there is normally a peak power capability of the brake resistor, i.e., there may be a limit on maximum current or voltage that can be fed to the brake resistor. Also, the electric machines may not at all operating conditions be able to generate the brake power level required for obtaining the desired braking operation.

An electrical motor is normally operated at maximum efficiency, meaning that maximum output power is generated during regenerative braking in order to recuperate as much energy as possible during downhill driving. However, it has been realized that there is a control freedom associated with electric machines which allow most electric machines to be operated at a reduced efficiency. An electric machine used to generate braking torque which is operated in a less energy efficient mode of operation will generate more heat and less output current compared to an electric machine that is operated at maximum efficiency.

Figure 2:
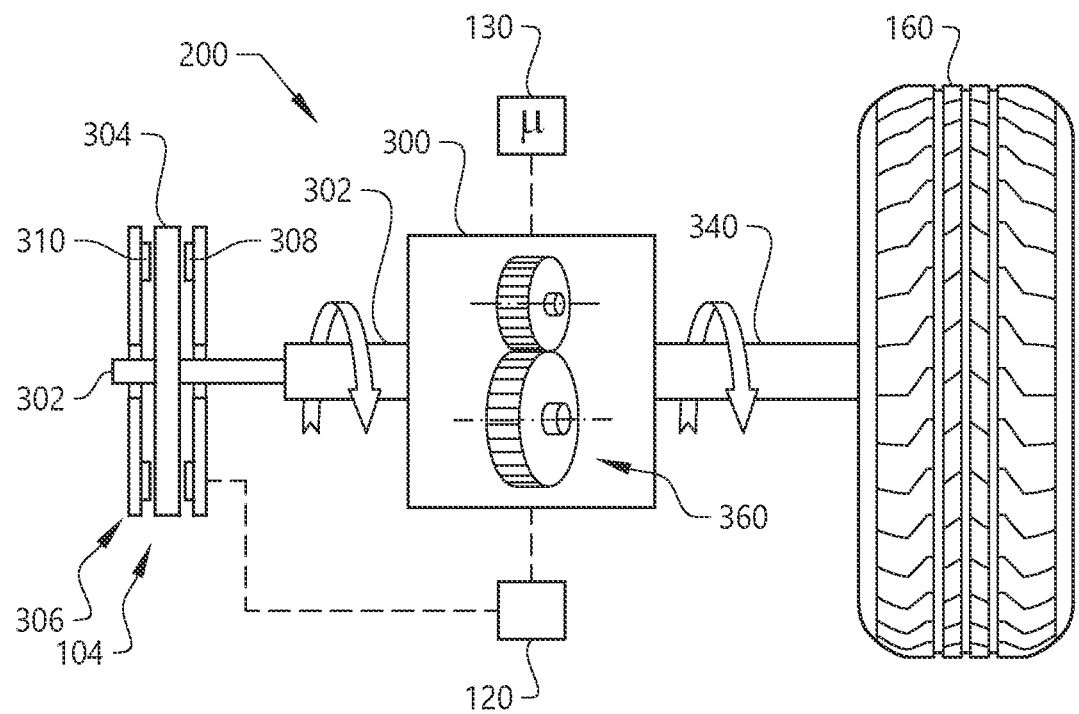
FIG. 2 is a schematic illustration of a wheel brake arrangement according to an example embodiment.

Turning to FIG. 2, which is a schematic illustration of a wheel brake arrangement 200 according to an example embodiment. The wheel brake arrangement 200 comprises the above described eddy current wheel brake 104. The eddy current wheel brake 104 is connected to the wheel 160 of the vehicle 100 for controlling the rotational speed of the wheel 160 during braking. In further detail, the eddy current wheel brake 104 is arranged to generate a brake torque on the wheel 160.

The eddy current wheel brake 104 comprises a conductive plate 304, i.e. a conductive disc. The conductive plate 304 is fixedly attached to a first shaft 302. The first shaft 302 is connected to a second shaft 340 via a transmission arrangement as will be described in further detail below, where the second shaft 340 is connected to the wheel 160. The conductive plate 304 thus rotates along with the rotation of the wheel 160. Further, the eddy current wheel brake 104 also comprises an electromagnet 306 configured to receive electric power from the above described the energy storage system 120. The electromagnet 306 comprises a north magnetic pole 308 and a south magnetic pole 310, where the north and south magnetic poles are arranged on a respective side of the conductive plate 304 and at a distance from the conductive plate 304. The electromagnet 306 is thus arranged stationary relative to the conductive plate 304.

When the conductive plate 304 moves past the stationary electromagnet, the electromagnet exerts a drag force on the metal which opposes its motion, due to circular electric currents, also referred to as eddy currents, induced in the metal by the magnetic field. Hereby, the rotational velocity of the conductive plate 304, and thus also the rotational velocity of the first shaft 302 and the wheel 160 is reduced. The conductive plate is preferably formed by a non-ferromagnetic metal such as e.g. copper or aluminium, which are not attracted to the electromagnet.

FIG. 2 illustrates the use of a single conductive plate 304. It should however be readily understood that if an increased brake capability of the eddy current wheel brake is desired, the eddy current wheel brake may be provided with a plurality of conductive plates between the north 308 and south 310 magnetic poles. In such configuration, the conductive plates are preferably arranged parallel with each other along the axial direction of the first shaft 302.

According to a non-limiting example, the eddy current wheel brake 104 may in addition to the above description also be electrically connected to the electric machine 101. Hereby, during braking when the electric machine generates electric power, the electric machine 101 can be controlled by the control unit 130 to feed the electric power to the eddy current wheel brake 104 such that the eddy current wheel brake 104 applies a brake torque on the wheel it is connected to. The electric machine 101 may also be controlled to feed a portion of the generated electric power to the eddy current wheel brake 104, and another portion of the generated electric power to the energy storage system 120.

As indicated above, the wheel brake arrangement 200 also comprises a transmission arrangement 300 connected to, and controlled by, the control unit 130. The transmission arrangement 300 is arranged between the eddy current wheel brake 104 and the wheel 160 of the vehicle 100. In particular, the eddy current wheel brake 104 comprises the above described first shaft 302 connected between an output side of the transmission arrangement 300 and the eddy current wheel brake 104, and a second shaft 340 connected between the wheel and an input side of the transmission arrangement 300. Thus, the rotational velocity from the second shaft 340 is varied by means of the transmission arrangement 300 such that the first shaft 302 rotates with a ratio compared to the rotation of the second shaft 340. The above described electric machine 101 may be arranged as a wheel hub motor. In such configuration, the second shaft 340 may be connected to the wheel 160 via the electric machine 101, i.e. the second shaft 340 is connected between an output side of the electric machine and the input side of the transmission arrangement 300.

As depicted in FIG. 2, the transmission arrangement 300 comprises a ratio varying arrangement 360 for obtaining the rotational ratio between the first 302 and second 340 shafts. In FIG. 2, the ratio varying arrangement 360 is schematically illustrated by two gear wheels in meshed connection with each other. This illustration is only made for simplified understanding, it should be readily understood that the ratio varying arrangement 360 may be electrically controlled, i.e. the ratio varying arrangement 360 is formed by an electronic control unit for controlling the rotational ratio between the first 302 and second 340 shafts by receiving a signal from the above described control unit 130. As will be evident from the below description of FIGS. 3a-3b, the ratio varying arrangement 360 may also be formed as a mechanical rotational varying arrangement 360.

Figure 3A:
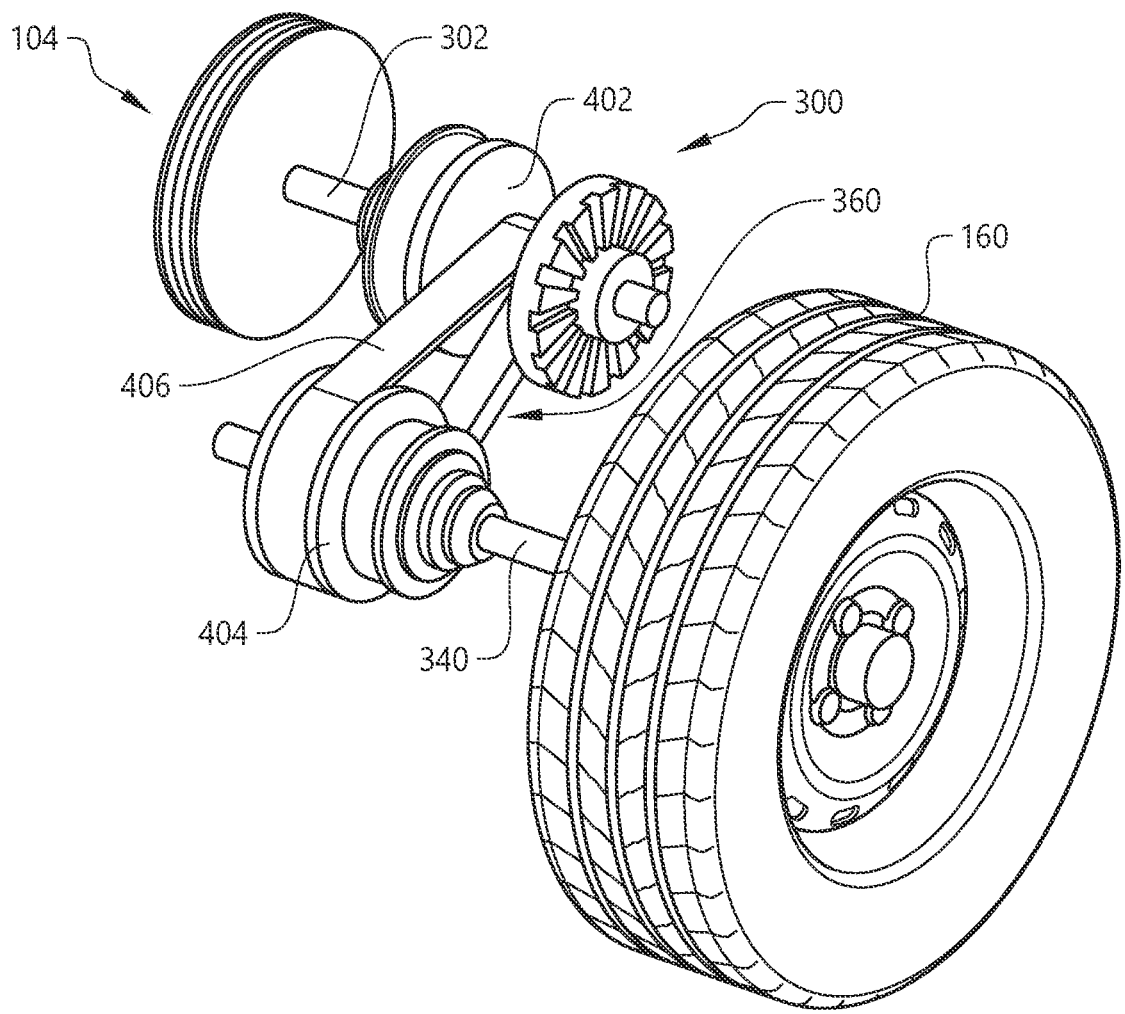
FIGS. 3a-3b schematically illustrate an example embodiment of a transmission arrangement suitably incorporated in a wheel brake arrangement.
Figure 3B:
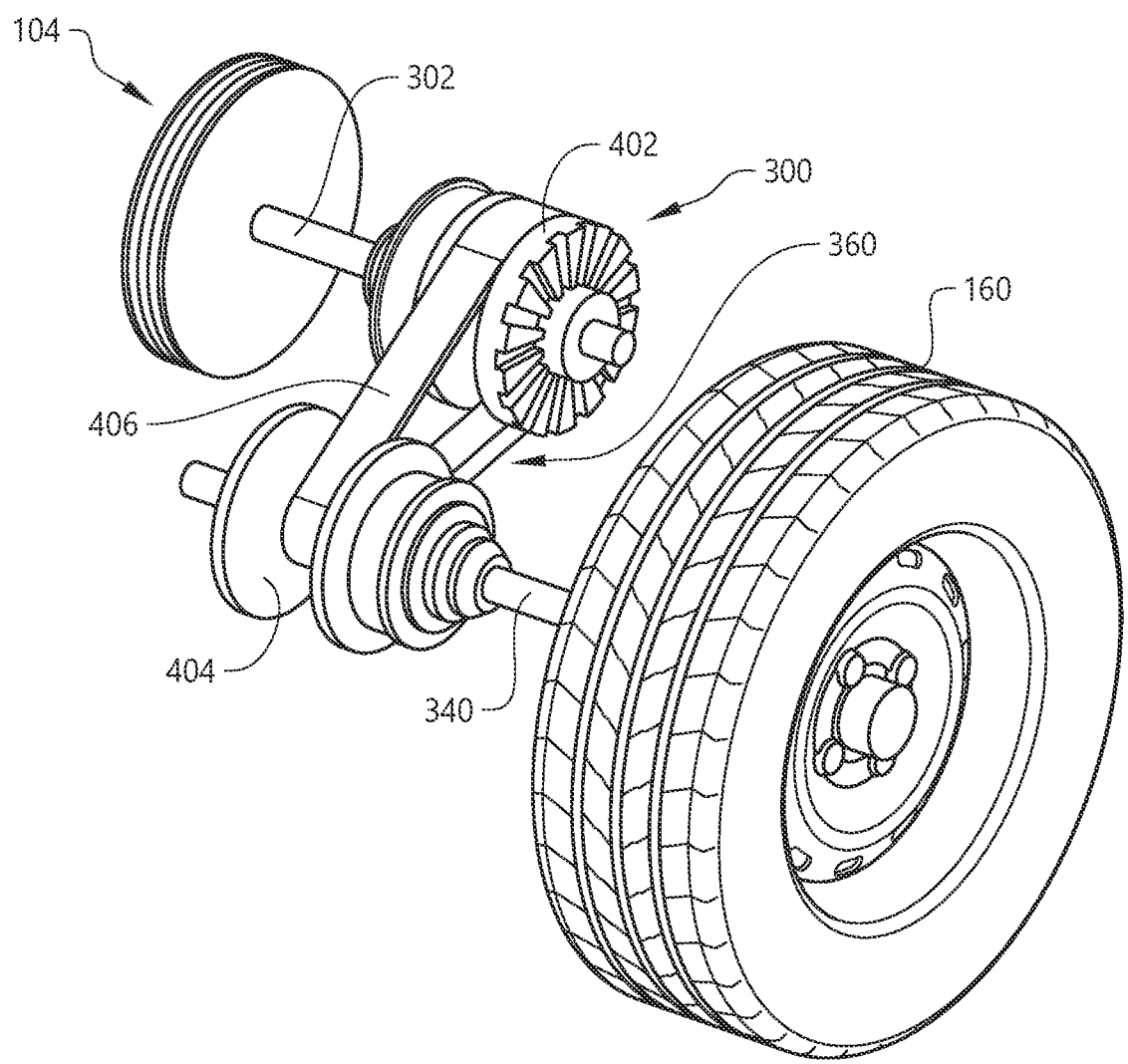

With reference to FIGS. 3a-3b, a transmission arrangement 300 provided with a mechanically controlled ratio varying arrangement 360 according to an example embodiment is depicted. The mechanically controlled ratio varying arrangement 360 is in FIGS. 3a-3b illustrated as a mechanically controlled continuously variable transmission. The exemplified mechanically controlled continuously variable transmission comprises a first variable-diameter pulley 402 connected to the first shaft 302, and a second variable-diameter pulley 404 connected to the second shaft 340. A V-belt 406 runs between the first 402 and second 404 variable-diameter pulleys. The first 402 and second 404 pulleys varies its diameter onto which the V-belt runs based on a signal received from the control unit (not explicitly illustrated in FIGS. 3a-3b). In the example depicted in FIG. 3a, the control unit has controlled the first variable-diameter pulley 402 to assume a small diameter onto which the V-belt runs, and the second variable-diameter pulley 404 to assume a large diameter onto which the V-belt runs. In the example depicted in FIG. 3b on the other hand, the control unit has controlled the first variable-diameter pulley 402 to assume a small diameter onto which the V-belt runs, and the second variable-diameter pulley 404 to assume a large diameter onto which the V-belt runs. By means of the configurations depicted in FIGS. 3a-3b, an increased rotational speed of the first shaft 302 in relation to the second shaft 340 is obtained in FIG. 3a, while a reduced rotation of the first shaft 302 relative to the second shaft 340 is obtained in FIG. 3b. The diameter of the first 402 and second 404 pulleys can be varied between any desired diameter between configurations depicted in FIGS. 3a-3b such that any desired rotational speed of the first shaft is obtained.

The ratio varying arrangement in FIGS. 3a-3b, as well as the one depicted in FIG. 2 is thus configured to vary a rotational ratio between the rotational speed of the first shaft and the rotational speed of the second shaft. Preferably, the ratio varying arrangement is configured to seamlessly vary the rotational ratio between the rotational speed of the first shaft 302 and the rotational speed of the second shaft 340. In further detail, the control unit 130 is configured to control a rotational speed of the first shaft to be maintained within a predetermined rotational speed range, as will be described in further detail below with reference to FIG. 4.

Figure 4:
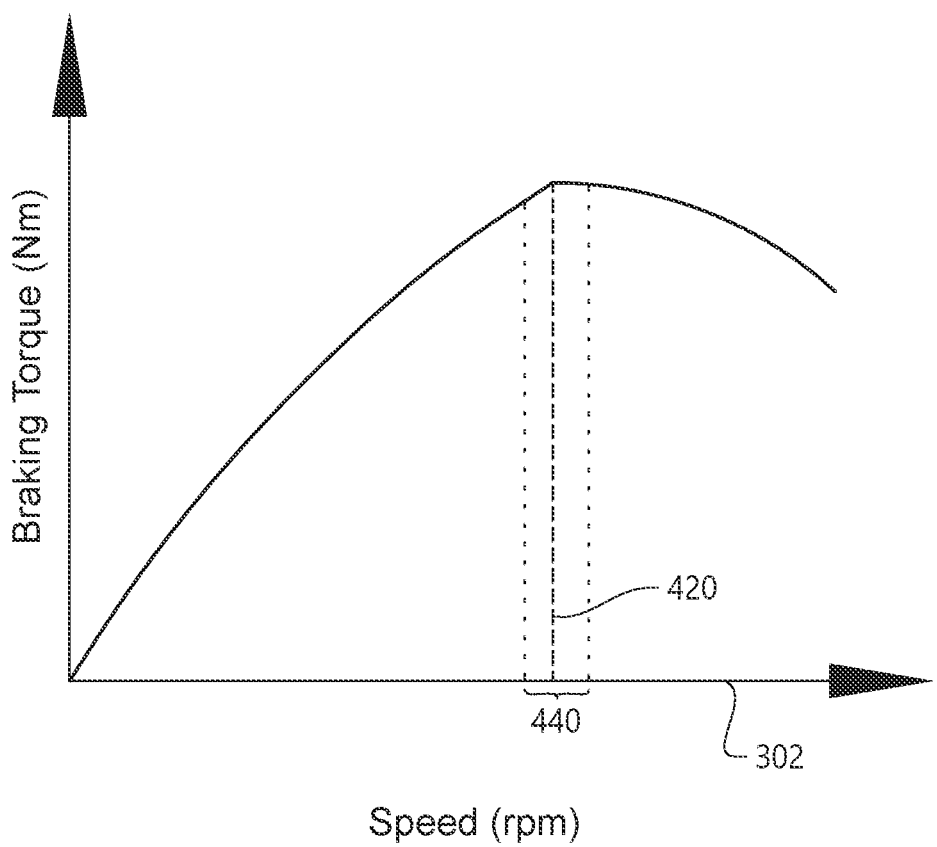
FIG. 4 is a diagram schematically illustrating the operation of the transmission arrangement according to an example embodiment.

Reference is now made to FIG. 4 for describing the control operation of the transmission arrangement 300 in further detail. FIG. 4 is a diagram schematically illustrating the operation of the transmission arrangement according to an example embodiment. The horizonal x-axis represents the rotational speed of the first shaft 302, and the vertical y-axis represents the brake torque obtained by the eddy current wheel brake 104. As can be seen in FIG. 4, the brake torque obtained by the eddy current wheel brake 104 is at a maximum capability at a predetermined, and relatively high rotational speed of the first shaft 302, i.e. at a relatively high rotational speed 420 of the conductive plate 304.

When the rotational speed of the conductive plate 304 reduces towards zero, the brake capability of the eddy current wheel brake significantly reduces. In particular, during crawling of the vehicle 100 or when the vehicle 100 is approaching a stand-still, the braking capability/capacity of the eddy current wheel brake can be insufficient for controlling the vehicle as desired. The braking capacity/capability of the eddy current wheel brake 104 is at an optimum when the rotational speed of the first shaft 302, i.e. the rotational speed of the conductive plate 304, is within a predetermined rotational speed range 440.

During operation, the control unit 130 thus controls the ratio varying arrangement 360 to maintain the rotational speed of the first shaft 302 to be within the rotational speed range 440. In particular, the control unit 130 controls the ratio varying arrangement 360 to maintain the rotational speed of the first shaft 302 to be within the rotational speed range 440 for any rotational speed of the second shaft below a predetermined threshold speed. Hence, the control unit 130 does not necessarily have to control the rotational speed of the first shaft when the rotational speed of the second shaft exceeds the predetermined threshold speed. The predetermined threshold speed may, for example, be a cruising speed of the vehicle 100.

In yet further detail, in order to maintain the rotational speed of the first shaft 302 to be within the predetermined speed range 440, the ratio varying arrangement increases the rotational speed of the first shaft relative to the second shaft. The rotational speed of the first shaft may preferably be controlled to be inverse proportional to the rotational speed of the second shaft.

Figure 5:
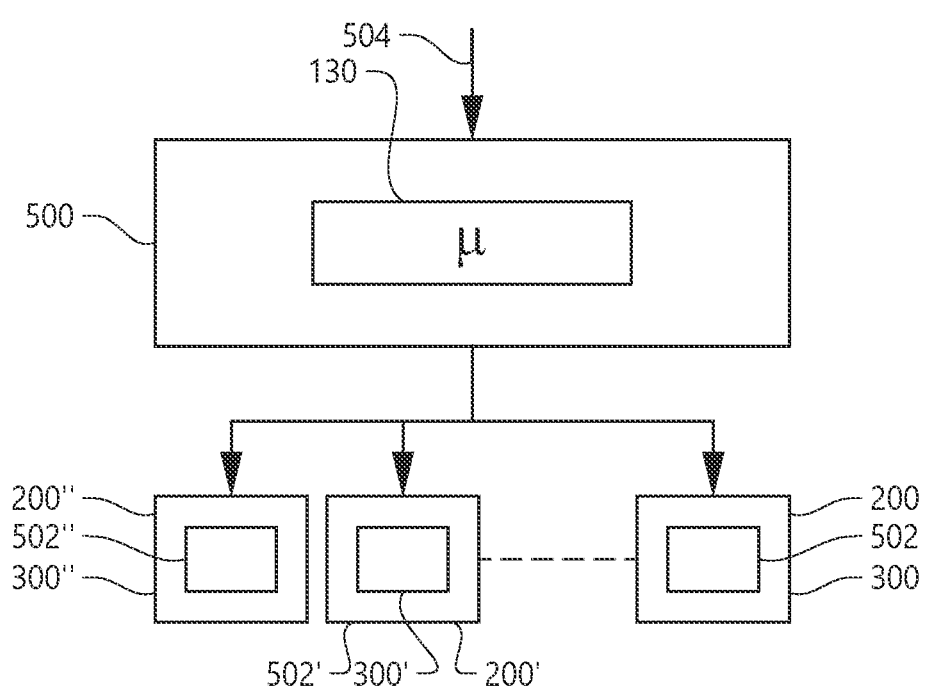
FIG. 5 illustrates control modules for operating the wheel brake arrangement according to an example embodiment.

The above described control unit 130 may form part of an upper layer vehicle motion management control system 500. Reference is now made to FIG. 5 to describe control modules for operating the above described wheel braking arrangement according to an example embodiment. In the example embodiment, a plurality of the wheels of the vehicle 100 comprises a respective wheel brake arrangement 300, 300', 300". Each of the wheel brake arrangements 300, 300', 300" comprises a respective transmission arrangement 200, 200', 200". In turn, each of the transmission arrangements 200, 200', 200" comprises a transmission control unit 502, 502', 502" connected to the upper layer vehicle motion control system 500. The upper layer motion control system 500 can hereby control each of the plurality of transmission arrangements 200, 200', 200" independently from the other transmission arrangements 200, 200', 200" by transmitting a control signal to a specific transmission control unit 502, 502', 502".

The upper layer vehicle motion control system 500 is arranged to receive a signal 504 indicative of a demanded braking operation, and/or a signal indicative of a rotational speed of the second shaft 340. The signal 504 may, for example, be a deceleration request.

When the upper layer vehicle motion control system 500 receives the signal(s), it determines a desired rotational speed of the first shaft 302 for obtaining the desired braking action by the eddy current wheel brake 104 for a specific wheel of the vehicle. The upper layer vehicle motion control system 500 thereafter transmits a signal to the transmission control unit 502, 502', 502". The signal transmitted from the upper layer vehicle motion control system 500 represents instructions which, when executed by the transmission control unit, cause the ratio varying arrangement to vary the rotational ratio between the first and second shafts. Hence, the transmission control unit 502, 502', 502" controls their respective transmission varying arrangement to control the speed of the first shaft 302 to be within the above described predetermined rotational speed range.

It should however be understood that according to another example embodiment, the transmission control units 502, 502', 502" may by themselves determine a desired rotational speed of the first shaft 302 for obtaining the desired braking action by the eddy current wheel brake 104, and to control the operation of the ratio varying arrangement.

Figure 6:
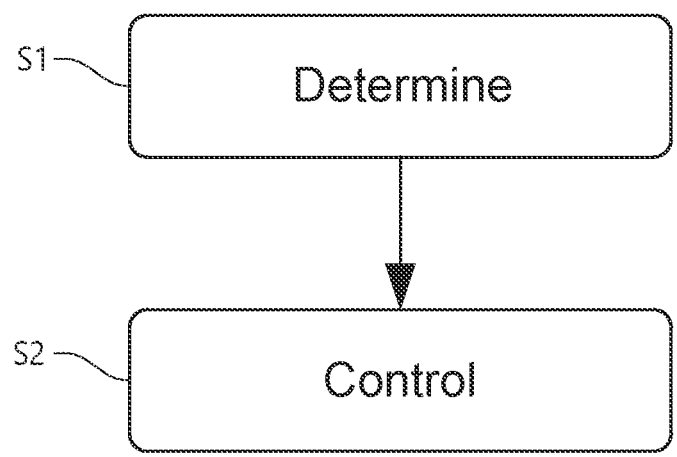
FIG. 6 is a flow chart of a method of controlling a wheel brake arrangement according to an example embodiment.

In order to sum up, reference is made to FIG. 6 which is a flow chart of a method of controlling a wheel brake arrangement according to an example embodiment. During operation of the vehicle, in particular during braking using the electric machine to generate a brake torque on the wheel(s) of the vehicle, the control unit 130 determines S1 a desired rotational speed of the first shaft 302 connected to the eddy current wheel brake 104.

The control unit 130 also controls S2 the ratio varying arrangement 360 to obtain a rotational ratio between the first 302 and second 340 shafts to maintain the desired rotational speed of the first shaft within a predetermined range 440 for any rotational speed below a predetermined threshold speed of the second shaft during braking.

It is to be understood that the present disclosure is not limited to the embodiments described above and illustrated in the drawings; rather, the skilled person will recognize that many changes and modifications may be made within the scope of the appended claims.

The invention claimed is:

1. A wheel brake arrangement for a vehicle, the wheel brake arrangement comprising:
   an eddy current wheel brake configured to receive electric power from a source of electric power of the vehicle during braking, and
   a transmission arrangement comprising a first shaft connected to the eddy current wheel brake and a second shaft connectable to a wheel of the vehicle,
   wherein the transmission arrangement comprises a ratio varying arrangement, the ratio varying arrangement being configured to, for any rotational speed below a predetermined threshold speed of the second shaft during braking, control a rotational speed of the first shaft to be maintained within a predetermined rotational speed range.

2. The wheel brake arrangement of claim 1, wherein the ratio varying arrangement is a continuously ratio varying arrangement configured to vary a rotational ratio between the rotational speed of the first shaft and the rotational speed of the second shaft.

3. The wheel brake arrangement of claim 2, wherein the continuously ratio varying arrangement is configured to seamlessly vary the rotational ratio between the rotational speed of the first shaft and the rotational speed of the second shaft.

4. The wheel brake arrangement of claim 1, wherein the eddy current wheel brake comprises a conductive plate operatively connected to the first shaft, and an electromagnet arranged stationary relative to the conductive plate.

5. The wheel brake arrangement of claim 4, wherein the eddy current wheel brake comprises a plurality of conductive plates.

6. The wheel brake arrangement of claim 1, wherein the ratio varying arrangement is configured to increase the rotational speed of the first shaft relative to the second shaft when the rotational speed of the second shaft is lower than a predetermined rotational threshold level.

7. The wheel brake arrangement of claim 1, wherein the ratio varying arrangement is configured to control the rotational speed of the first shaft to be inverse proportional to the rotational speed of the second shaft.

8. The wheel brake arrangement of claim 1, wherein the wheel brake arrangement further comprises a control unit connected to the transmission arrangement, the control unit comprising control circuitry configured to:
   determine a desired rotational speed of the first shaft, and
   control the ratio varying arrangement to obtain a rotational ratio between the first and the second shafts to maintain the desired rotational speed of the first shaft within the predetermined range.

9. The wheel brake arrangement of claim 8, wherein the control unit forms part of an upper layer vehicle motion control system, and wherein the transmission arrangement comprises a transmission control unit connected to the upper layer vehicle motion control system.

10. The wheel brake arrangement of claim 9, wherein the control circuitry of the upper layer vehicle motion control system is configured to control the ratio varying arrangement by transmitting a signal to the transmission control unit, the signal represents instructions which, when executed by the transmission control unit, cause the ratio varying arrangement to vary the rotational ratio between the first and the second shafts.

11. The wheel brake arrangement of claim 1, wherein the eddy current wheel brake is electrically connectable to an energy storage system of the vehicle.

12. The wheel brake arrangement of claim 1, wherein the eddy current wheel brake is electrically connectable to an electric wheel motor of the vehicle, the eddy current wheel brake being configured to receive electric power from the electric wheel motor during braking.

13. A method of controlling a wheel brake arrangement, the wheel brake arrangement comprising an eddy current wheel brake configured to receive electric power from a source of electric power of the vehicle during braking, and a transmission arrangement comprising a first shaft connected to the eddy current wheel brake and a second shaft connected to a wheel of the vehicle, wherein the transmission arrangement comprises a ratio varying arrangement, the method comprising:
   determining a desired rotational speed of the first shaft, and
   controlling the ratio varying arrangement to obtain a rotational ratio between the first and the second shafts to maintain the desired rotational speed of the first shaft within a predetermined range for any rotational speed below a predetermined threshold speed of the second shaft during braking.

* * * * *